United States Patent [19]

Maijers

[11] Patent Number: 4,788,625
[45] Date of Patent: Nov. 29, 1988

[54] METHOD OF PROVIDING A LEAD TO AN END OF A CAPACITOR AND A CAPACITOR MANUFACTURED ACCORDING TO THIS METHOD

[75] Inventor: Andries C. Maijers, Eindhoven, Netherlands

[73] Assignee: U.S. Philips Corporation, New York, N.Y.

[21] Appl. No.: 115,474

[22] Filed: Oct. 30, 1987

[30] Foreign Application Priority Data

Nov. 6, 1986 [NL] Netherlands .................. 8602804

[51] Int. Cl.[4] .................. H01G 1/14; H01G 7/00
[52] U.S. Cl. .................. 361/306; 29/25.42; 361/309
[58] Field of Search .............. 361/306, 308, 309, 310, 361/320, 321; 29/25.42; 338/329

[56] References Cited

U.S. PATENT DOCUMENTS

| 3,267,343 | 8/1966 | Rayburn | 361/308 |
| 3,274,663 | 9/1966 | Bonenfant et al. | 361/306 X |
| 3,364,401 | 1/1968 | Rayburn | 361/309 |
| 3,411,193 | 11/1968 | Takacs | 361/306 X |
| 3,573,422 | 4/1971 | Langenbach et al. | 338/329 X |
| 4,138,656 | 2/1979 | Resnicow | 338/329 X |

FOREIGN PATENT DOCUMENTS 1130811 10/1956 France .................. 361/306

Primary Examiner—Donald A. Griffin
Attorney, Agent, or Firm—Norman N. Spain

[57] ABSTRACT

The invention relates to a method of providing a lead to an end of a capacitor which is formed of two metal foils which are wound together and between which an insulating material is provided, in which at one end of the capacitor the edge of one foil projects from the edge of the other, and at the opposite end of the capacitor the edge of the latter foil projects from the edge of the former, viewed in the direction perpendicular to the longitudinal direction of the foils.

According to the invention the projecting ends of the foils are coated with a metal layer. Next, the end of a lead is pressed onto the metal layer at each end of the capacitor, while heating the lead and/or the metal layer. The said end has two substantially contiguous portions which are pressed against the outside of the metal layer and are interconnected by a connecting portion which is offset from the plane of symmetry of the contiguous portions and is pressed into the metal layer.

6 Claims, 1 Drawing Sheet

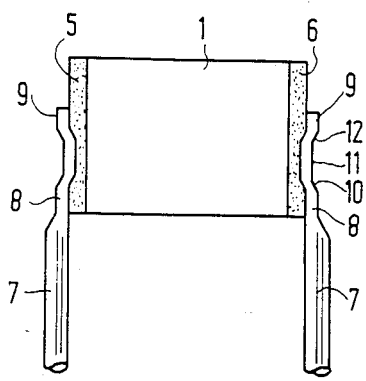 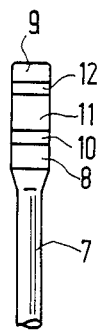 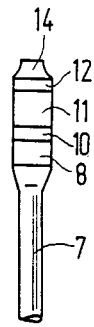
FIG. 1  FIG. 3  FIG. 5
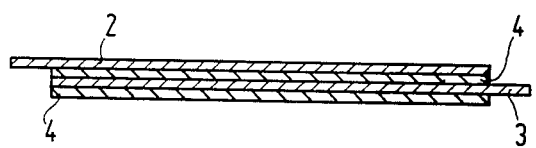
FIG. 2
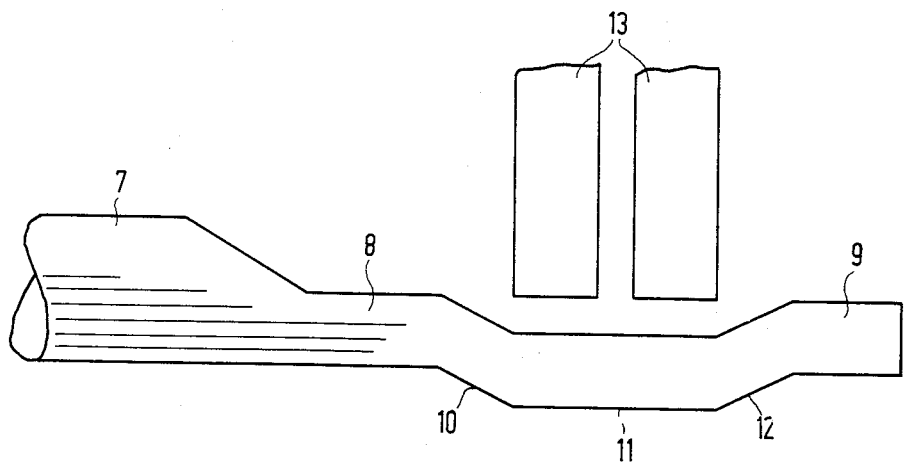
FIG. 4

METHOD OF PROVIDING A LEAD TO AN END OF A CAPACITOR AND A CAPACITOR MANUFACTURED ACCORDING TO THIS METHOD

BACKGROUND OF THE INVENTION

The invention relates to a method of providing a lead to an end of a capacitor which is formed of two metal foils which are wound together and between which an insulating material is provided, in which at one end of the capacitor the edge of one foil projects from the edge of the other, whereas at the other end of the capacitor the edge of the latter foil projects from the edge of the former, viewed in the direction perpendicular to the longitudinal direction of the foils.

The German Patent Application No. 2,717,382 discloses a method in which a lead is provided by urging a plate-shaped member which carries the lead against one end of the capacitor formed by the wound foils. In this method, the plate-shaped member has projecting ribs which are brought into contact with the projecting edge of a foil on the relevant side of the capacitor. The shape of the plate-shaped member substantially corresponds to the cross-section of the capacitor. The plate-shaped member is bonded to the capacitor by melting the insulating material so that an adhesive layer is formed between the end of the capacitor and the plate-shaped member.

The plate-shaped member is relatively heavy and the leads connected thereto and extending in a perpendicular direction to this plate-shaped member hamper the incorporation of the capacitor, or require relatively much room.

Moreover, there is the possibility of molten insulating material penetrating between the ribs of the plate-shaped member and the metal foils, thereby adversely affecting the formation of a satisfactory contact between the leads and the metal foils.

SUMMARY OF THE INVENTION

According to the invention the projecting ends of the foils are coated with a metal layer onto which the end of a lead is pressed, while heating the lead and/or the metal layer, which end has two substantially contiguous portions which are interconnected by a connecting portion which is & offset from the plane of symmetry and which is symmetrical relative to a plane of symmetry which extends halfway between the facing ends of the contiguous portions and perpendicularly to the longitudinal axis of these portions, the connecting portion being pressed into the metal layer over such a distance that the contiguous portions lie against the outside of the metal layer.

The metal layer ensures a satisfactory connection between the edge portions of the foils and, consequently, between the foils and the lead provided on the metal layer. In securing the lead, the connecting portion which interconnects the contiguous portions is pressed into the metal layer which is softened by heating, and the flattened portions come to rest on the outside of the metal layer such that an even well-defined penetration of the connecting portion into the metal layer is obtained.

Moreover, the leads can readily be provided parallel to the end faces of the capacitor, which usually facilitates the future incorporation of the capacitor in a limited space.

The invention will now be explained in more detail by means of an exemplary embodiment of the construction according to the invention which is shown schematically in the accompanying drawings.

BRIEF DESCRIPTION OF THE DRAWING

In the drawing FIG. 1 is a schematic side view of a capacitor manufactured according to the method of the invention, FIG. 2 is a larger scale sectional view of a combination of two layers of metal foils and insulating material provided thereon suitable for use in the manufacture of a capacitor of FIG. 1., FIG. 3 is a side view of the lead of the capacitor shown in FIG. 1 as seen from the left FIG. 4 is a larger scale view of one end of the lead shown in FIG. 3 and FIG. 5 is a side view of an additional embodiment of a lead corresponding to that of FIG. 3.

DETAILED DESCRIPTION OF THE INVENTION

FIG. 1 is a view of a capacitor 1 which is formed of two metal foils 2 and 3 between which an insulating material 4 is provided. The foils 2 and 3 which are in shown cross-section in FIG. 2 are formed by elongated strips which are wound together such that during winding the capacitor 1 can be given any desired cross-section. This cross-section may be, for example, circular, oval or elongated. The capacitor may also be formed of foils of insulating material on which metal layers are provided by vacuum evaporation, and which serve as electrodes.

As is shown in FIG. 2, on one side of the capacitor (in FIG. 2 the left-hand side) the edge of the metal foil 2 projects from the metal foil 3, whereas on the other side (in FIG. 2 the right-hand side) the edge of the metal foil 3 projects from the metal foil 2.

After the metal foils 2 and 3 have been wound together, metal layers 5 and 6, respectively, are applied to the ends of the metal foils in such a way that the projecting edge of the foil 2 is embedded in the metal layer 5 and the projecting edge of the foil 3 is embedded in the metal layer 6. Such metal layers 5 and 6 can be provided efficaciously by spraying on a suitable metal, the so-called metal spraying. An useful thickness of such a layer is 200–300 micrometer, and a material which can suitably be used is a mixture of Zn and Sn.

Subsequently, the leads 7 can be provided. Such leads, which often have a circular cross-section with a diameter of 0.6 mm are flattened at the ends to a thickness of ±0.3 mm. Such a flattened end is formed in the way shown in FIG. 4, i.e. the end has two flattened elongated contiguous portions 8 and 9 which are interconnected by a connecting portion which is formed of three portions 10–12 which lie at an angle to each other.

As is shown in FIG. 4, both portions 10 and 12 are bent through an angle of approximately 45° relative to the portions 8 and 9, such that with respect to the facing ends of the portions 8 and 9 they extend in facing directions. The ends of the portions 10 and 12 facing away from the portions 8 and 9 are interconnected by a portion 11 which runs parallel to the portions 8 and 9.

FIG. 4 shows that the connecting portion which comprises the portions 10–12 is constructed so that it is symmetrical with respect to a plane of symmetry which is perpendicular to the plane of the drawing, which plane of symmetry is situated halfway between the facing ends of the flattened portions 8 and 9.

In order to secure the lead to the capacitor, the portion 11 of the connecting portion is positioned against the outside surface of a metal layer 5 or 6 and is urged against the said metal layer 5 or 6 by means of two electrodes 13, while current is simultaneously applied via these electrodes. Consequently, the connecting portion 10–12 and the metal layer 5 or 6 below the connecting portion will be heated, thereby softening the metal layer such that the connecting portion can be pressed into the metal layer. The contiguous flattened portions 8 and 9 will also contact the outside surface of the metal layer, thereby limiting the extent to which the flattened end of the lead can be pressed into the metal layer.

Moreover, the flattened portions 8 and 9 which are situated on either side of the portion 10–12 which is pressed into the metal layer 5 or 6 prevent the end of the lead from being obliquely pressed into the metal layer, not only because the portion pressed into the metal layer is supported on either side by the flattened portions 8 and 9 but also because these portions act as heat dissipators and, consequently, the temperature of the free end of the portion pressed into the metal layer is not substantially higher than that of the other end of the portion.

The length of the straight portion 11 is mainly determined by the dimensions of the electrodes 13 to be used and by the necessary interval between these electrodes.

The distance between one end of the horizontal portion 11 and the end of a flattened portion 8 or 9 which is connected to this end amounts to approximately twice the thickness of the metal spraying layer, measured in the longitudinal direction of these flattened portions 8 and 9.

In FIG. 4, the distance between the underside of a flattened portion 8 or 9 and the underside of the portion 11 amounts to approximately 0.5–1 times the thickness of the metal spraying layer.

The length of the freely projecting flattened portion 9 is preferably greater than the length of a bevelled portion 10 or 12.

The exemplary embodiment of a lead shown in FIG. 5 largely corresponds to that shown in FIG. 3. Consequently, all corresponding components of FIGS. 5 and 3 bear the same reference numerals. In this embodiment, however, the free end 14 of the lead is not flattened as is free of the lead shown in FIG. 3 the end 9 but has a circular shape instead. Also in this embodiment favourable results can be obtained.

What is claimed is:

1. A method of providing a lead to an end of a capacitor which is formed of two metal foils which are wound together and between which an insulating material is provided, in which at one end of the capacitor the edge of one foil projects from the edge of the other, whereas at the other end of the capacitor the edge of the latter foil projects from the edge of the former, viewed in the direction perpendicular to the longitudinal direction of the foils, characterized in that the projecting ends of the foils are coated with a metal layer onto which the end of a lead is pressed, whilst heating the lead and/or the metal layer, which end has two substantially contiguous portions which are interconnected by a connecting portion which is offset from the plane of symmetry and which is symmetrical relative to a plane of symmetry which extends halfway between the facing ends of the contiguous portions and perpendicularly to the longitudinal axis of these portions, the connecting portion being pressed into the metal layer over such a distance that the contiguous portions lie against the outside of the metal layer.

2. A method as claimed in claim 1, characterized in that at least one of the contiguous portions is flattened before the lead is provided.

3. A method as claimed in claim 1, characterized in that both contiguous portions are flattened before the lead is provided.

4. A method as claimed in claim 1, characterized in that a connecting portion which interconnects the contiguous portions at the end of the lead comprises a portion which extends parallel to these contiguous portions, which portion is connected to the facing ends of the contiguous portions by means of other portions which extend obliquely upward, in opposite directions.

5. A method as claimed in claim 1, characterized in that, relative to the contiguous portions, the connecting portion is pressed into the metal layer applied to one end of the capacitor, over a distance of 0.5–1 times the thickness of said layer.

6. A capacitor formed of two metal foils which are wound together and between which an insulating material is provided, in which at one end of the capacitor the edge of one foil projects from the edge of the other foil, and at the opposite end of the capacitor the edge of the latter foil projects from the edge of the former, viewed in a direction perpendicular to the longitudinal direction of the foils, whilst leads are secured to the capacitor at the opposed ends of the capacitor, characterized in that the projecting ends of the foils are coated with a metal layer to which the end of a lead is secured, this end having two substantially contiguous portions which lie against the outside of the metal layer, which portions are interconnected by a connecting portion which is pressed into the metal layer, which connecting portion is offset from the plane of symmetry and is symmetrical relative to a plane of symmetry which extends halfway between the facing ends of the contiguous portions and perpendicularly to the longitudinal axis thereof.

* * * * *